United States Patent
Matsuse

(10) Patent No.: US 8,185,679 B2
(45) Date of Patent: May 22, 2012

(54) CONTROLLING BUS ACCESS

(75) Inventor: Shuhsaku Matsuse, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 12/684,141

(22) Filed: Jan. 8, 2010

(65) Prior Publication Data
US 2010/0180056 A1 Jul. 15, 2010

(30) Foreign Application Priority Data

Jan. 15, 2009 (JP) .................................. 2009-6827

(51) Int. Cl.
G06F 13/00 (2006.01)
(52) U.S. Cl. ......... 710/107; 710/311; 710/312; 710/316
(58) Field of Classification Search .......... 710/104–119, 710/306–317
See application file for complete search history.

(56) References Cited

U.S. PATENT DOCUMENTS

| 6,701,397 | B1 * | 3/2004 | Foster et al. .................. | 710/107 |
| 6,804,738 | B2 * | 10/2004 | Weber .......................... | 710/244 |
| 7,043,595 | B2 * | 5/2006 | Kawai .......................... | 710/314 |
| 7,231,475 | B1 * | 6/2007 | Singla et al. .................. | 710/117 |
| 7,346,722 | B2 * | 3/2008 | Phelps et al. .................. | 710/305 |
| 7,356,631 | B2 * | 4/2008 | Lin ............................... | 710/243 |
| 7,743,197 | B2 * | 6/2010 | Chavan et al. ................. | 710/314 |
| 7,779,188 | B2 * | 8/2010 | Spry et al. .................... | 710/112 |
| 7,802,040 | B2 * | 9/2010 | Aldworth et al. ............. | 710/118 |
| 2002/0010822 | A1 * | 1/2002 | Kim .............................. | 710/110 |
| 2004/0199692 | A1 * | 10/2004 | Phelps et al. .................. | 710/113 |
| 2006/0200607 | A1 * | 9/2006 | Subramaniam Ganasan et al. ............................ | 710/113 |
| 2007/0198758 | A1 * | 8/2007 | Asano et al. .................. | 710/110 |
| 2009/0287865 | A1 * | 11/2009 | Aldworth et al. ............. | 710/110 |
| 2010/0095036 | A1 * | 4/2010 | Mittal et al. .................. | 710/117 |

FOREIGN PATENT DOCUMENTS

| JP | 63244161 | 10/1988 |
| JP | 05-242047 A | 9/1993 |
| JP | 6-332850 | 12/1994 |
| JP | 06-332850 A | 12/1994 |
| JP | 08-228200 A | 9/1996 |
| JP | 10-275131 A | 10/1998 |
| JP | 2002-082900 A | 3/2002 |
| JP | 2002-539509 A | 11/2002 |
| JP | 2003233583 | 8/2003 |
| JP | 2006323760 | 11/2006 |
| WO | WO2007/022019 | 2/2007 |

* cited by examiner

Primary Examiner — Raymond Phan
(74) Attorney, Agent, or Firm — Yuanmin Cai

(57) ABSTRACT

An apparatus that controls access by multiple IP cores to a bus is provided. The apparatus includes a main controller and multiple sub controllers, each of the sub controllers being associated with each IP cores. The main controller switches connection between each of the IP cores and the bus according to a schedule predetermined based on predetermined time slices. Each of the sub controllers controls access by the IP core to the bus according to a schedule under the control of the main controller. Embodiments of the present invention provide method and apparatus to ensure real-time accessibility to a bus shared by multiple IP cores and improve bus use efficiency.

9 Claims, 7 Drawing Sheets

CONTROLLING BUS ACCESS

CROSS-REFERENCE TO RELATED APPLICATION

The present application claims the benefit of priority of a Japanese Patent Application No. 2009-6827, filed Jan. 15, 2009 with the Japan Patent Office, the content of which is incorporated herein by reference in its entirety.

FIELD OF THE INVENTION

The present invention relates to an apparatus and a method for controlling bus access in a system in which multiple IP cores share a bus.

BACKGROUND OF THE INVENTION

In a system in which a bus such as a system bus is shared by multiple devices (IP cores), a controller (bus arbiter) allocates access to the bus among the IP cores. Each IP core requests access to the bus through the controller. Whenever the controller receives a request from an IP core, the controller arbitrates among the IP cores to allocate access to the bus to the IP core according to a preset rule such as priority given to each IP core.

FIG. 7 schematically illustrates a configuration of a bus control system of this type. As illustrated in FIG. 7, the controller (bus arbiter) 701 and multiple IP cores 702 are connected onto a bus 703. The IP cores 702 share the bus 703 under the control of the controller 701.

An existing technique of this type has been disclosed in Patent document 1 (Published Unexamined Japanese Patent Application No. 6-332850) in which, in a computer system where multiple devices and a bus controller which arbitrates bus ownership of a system bus are connected to the system bus, the bus controller has the function of allocating a certain amount of data transfer time to channels to which the devices are connected at certain time intervals. With this configuration, the system allows multimedia data including audio and moving image data to be handled in a manner similar to that in data transfer by conventional I/O devices.

The above system where multiple IP cores share the bus as described above was unable to explicitly ensure hard real-time accessibility and bus-band availability. These can be ensured only by adjusting the bus occupancy rates among the IP cores. Another problem with the system is that when a particular IP core has a long burst length or a high priority bus access, other IP cores have a much less chance of gaining bus access.

SUMMARY OF EMBODIMENTS OF THE INVENTION

Embodiments of present invention ensure real-time accessibility by IP cores to a bus and to improve bus use efficiency.

Embodiments of present invention may be implemented as method and apparatus, as being described below, to achieve the above objects. The apparatus controlling access by a plurality of IP cores to a bus includes a main controller which changes connection between each of the IP cores and the bus in accordance with a predetermined schedule, and a sub controller provided in association with each of the IP cores and controlling the access by the IP core to the bus in accordance with the schedule.

The schedule is determined on the basis of preset time slices.

More specifically, the main controller allocates access to the bus to each of the IP cores in accordance with the schedule and provides a notification of the allocation to the sub controller associated with the IP core. The sub controller performs data transmission and reception by the IP core in accordance with the notification provided by the main controller.

The main controller provides, in accordance with the schedule, to each of the sub controllers associated with the IP cores a notification that the bus is available. The sub controller performs data transmission and reception by the IP core in a time slice identified by the notification provided by the main controller and suspends data transmission and reception by the IP core in time slices other than the time slice being identified.

The sub controller receives a request for access to the bus from the IP core and provides a notification of the request to the main controller. When receiving the notification provided by the sub controller, the main controller allocates access to the bus to the IP core associated with the sub controller.

The present invention can also be implemented as the following method. The method is implemented by a bus control apparatus including a selector changing connection between each of the IP cores and the bus, a sequencer controlling connection change by the selector under program control, and a sub control circuit provided in association with each of the IP cores and controlling access by the IP core to the bus. The method includes the steps of: by the sequencer, allocating access to the bus to each of the IP cores in accordance with a predetermined schedule, controlling connection change by the selector on the basis of the bus allocation, and providing a notification of the bus allocation to the sub control circuit associated with each of the IP cores; and, by the sub control circuit, performing data transmission and reception by the IP core in accordance with the notification provided by the sequencer.

According to the present invention, bus access is allocated to each IP core according to a predetermined schedule and therefore a bus band available to each IP core can be predicted. Consequently, real-time accessibility by the IP cores to the bus can be ensured and bus use efficiency can be improved.

Figure 1:
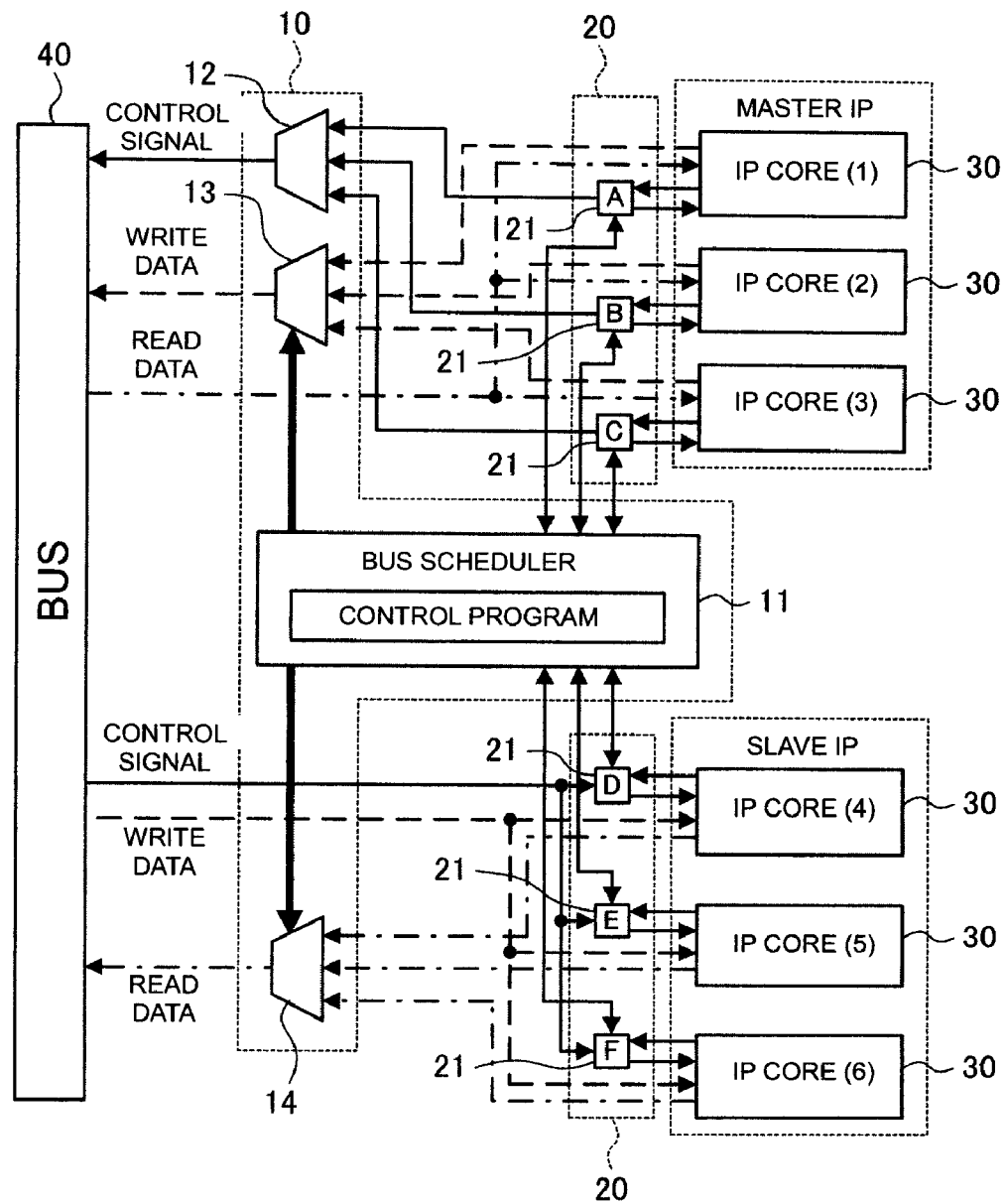
FIG. 1 illustrates an exemplary configuration of a bus control system to which an embodiment of present invention is applied.

Representation of various reference numerals used in the drawings are summarized as in below:
10 . . . Main controller,
11 . . . Bus scheduler,
12, 13, 14 . . . Multiplexer,
20 . . . Sub controller,
21 . . . Pre-arbiter, 30 . . . IP core,
40 . . . Bus

DETAILED DESCRIPTION OF EMBODIMENTS

Embodiments of the present invention will be described below in detail with reference to the accompanying drawings.
<System Configuration>

FIG. 1 illustrates an exemplary configuration of a bus control system to which an embodiment of the present invention is applied.

As illustrated in FIG. 1, the bus control system of the present embodiment includes a main controller 10 which allocates access to a bus 40 and a sub controller 20 which controls access by IP cores 30 to the bus 40 under the control of the main controller 10. In the example illustrated in FIG. 1, six IP cores 30 share the bus. In the following description, when the individual cores 30 need to be distinguished from one another, the numbers that are assigned to individual IP cores 30 in FIG. 1 are used to denote the IP cores, like IP core 30 (1), . . . , IP core 30 (4), and so on. IP cores 30 (1) to (3) among the IP cores 30 depicted in FIG. 1 are master IP cores and IP cores 30 (4) to (6) are slave IP cores. The master and slave IP cores 30 are depicted as separate groups in FIG. 1 in order to clearly illustrate the functions of the IP cores 30. In reality, however, a physically single IP core may have functions of both master and slave IP cores.

The main controller 10 includes a bus scheduler (sequencer) 11 which manages scheduling of sharing the bus 40 by the IP cores 30 and multiplexers (selectors) 12 to 14, each of which switches connection between an IP core 30 and the bus 40 in accordance with the control of the bus scheduler 11. The sub controller 20 includes pre-arbiters 21, each associated with each IP core 30. When the individual pre-arbiters 21 need to be differentiated from one another in the following description, alphabetic letters assigned to the pre-arbiters 21 in FIG. 1 are used to denote the individual pre-arbiters 21, like pre-arbiter 21A, . . . , pre-arbiter 21D, and so on. In the configuration illustrated, pre-arbiter 21A is associated with IP core 30 (1), pre-arbiter 21B is associated with IP core 30 (2), pre-arbiter 21C is associated with IP core 30 (3), pre-arbiter 21D is associated with IP core 30 (4), pre-arbiter 21E is associated with IP core 30 (5), and pre-arbiter 21F is associated with IP core 30 (6).

The bus scheduler 11 switches connection of the multiplexers 12 to 14 according to preset time slices. The bus scheduler 11 sends a control signal to pre-arbiters 21 to allocate bus access to each IP core 30 according to the time slices. The order in which access to the bus 40 is allocated to the IP cores 30 and setting of the time slices are performed by a control program that controls the bus scheduler 11. That is, access to the bus 40 is allocated to the IP cores 30 in accordance with software control by the control program in the present embodiment. Scheduling for allocating access to the bus 40 to the IP cores 30 may be performed on the basis of the same concept as time-sharing in an RTOS (Real-Time Operating System).

Multiplexer 12 switches connection between master IP cores 30 (1) to (3) (pre-arbiters 21A to 21C) and the bus 40 and sends a control signal output from IP cores 30 (1) to (3) to the bus 40.

Multiplexer 13 switches connection between master IP cores 30 (1) to (3) and the bus 40 and sends write data output from IP cores 30 (1) to (3) onto the bus 40.

Multiplexer 14 switches connection between slave IP cores 30 (4) to (6) and the bus 40 and sends data read from IP cores 30 (4) to (6) onto the bus 40.

The pre-arbiter 21 requests access to the bus 40 from the bus scheduler 11 and receives a control signal from the bus scheduler 11 to gain bus access. The pre-arbiter 21 controls data transmission and reception by the IP core 30 according to bus access granted by the bus scheduler 11. Specifically, the pre-arbiter 21 allows the IP core 30 to transmit and receive data only in time slices that can be used by the IP core 30 with the bus access granted to the pre-arbiter 21. In the other time slices, the pre-arbiter 21 suspends data transmission and reception by the IP core 30.

Figure 2:
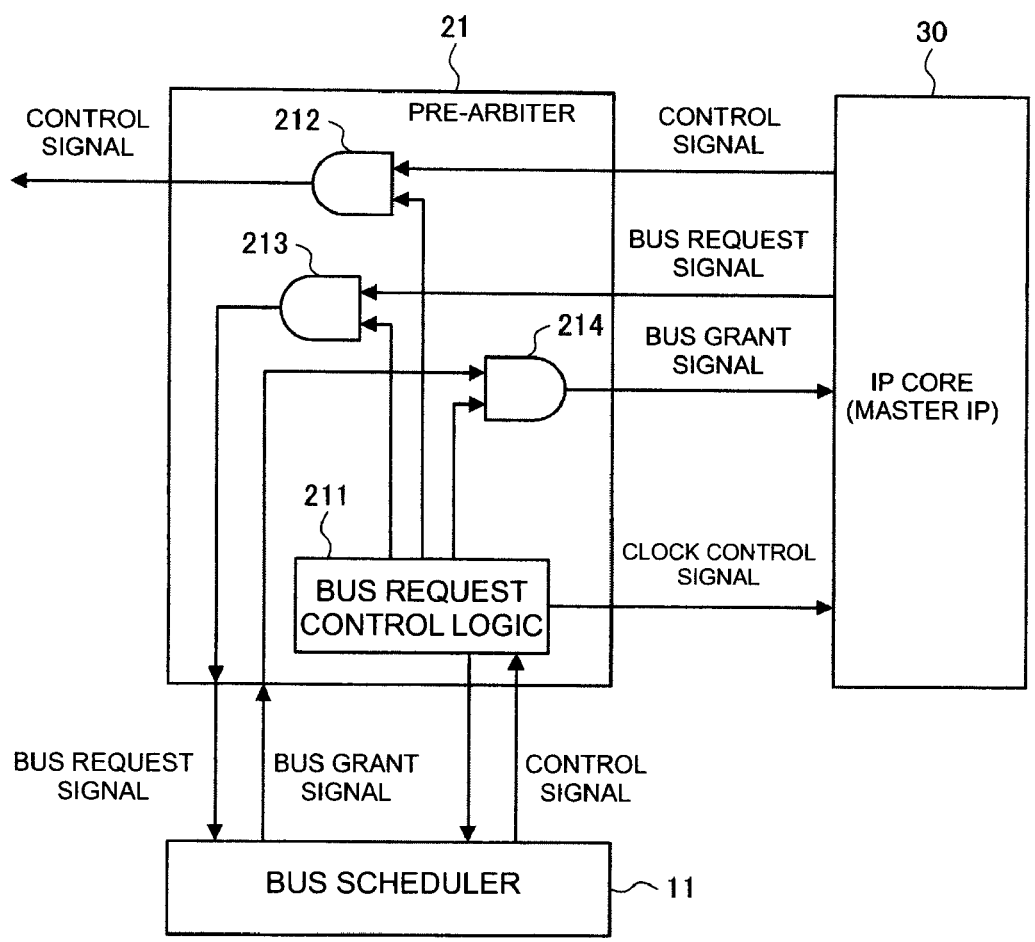
FIG. 2 illustrates a configuration of a pre-arbiter for master IP core according to one embodiment of present invention.

FIG. 2 illustrates a configuration of one of the pre-arbiters 21 for master IP cores (pre-arbiters 21A to 21C in the example in FIG. 1) according to one embodiment of the present invention.

As illustrated in FIG. 2, the master IP pre-arbiter 21 includes a bus request control logic 211 and AND circuits 212, 213, and 214.

The bus request control logic 211 sends and receives control signals to and from the bus scheduler 11. Specifically, for example the bus request control logic 211 sends an advance notice of access to the bus 40 to the bus scheduler 11 and receives a grant of access to the bus 40 from the bus scheduler 11. The bus request control logic 211 also sends a clock control signal to the IP core 30. The bus request control logic 211 outputs a control signal for controlling signal transmission and reception by the IP core 30.

AND circuit 212 ANDs (performs logical operation AND) a control signal output from the IP core 30 and a control signal output from the bus request control logic 211 and outputs the control signal onto the bus 40.

AND circuit 213 ANDs a signal indicating a request for access to the bus 40 (bus request signal) output from the IP core 30 and a control signal output from the bus request control logic 211 and outputs the bus request signal to the bus scheduler 11.

AND circuit 214 ANDs a signal indicating a grant of access to the bus 40 (bus grant signal) output from the bus scheduler 11 and a control signal output from the bus request control logic 211 and outputs the bus grant signal to the IP core 30.

Figure 3:
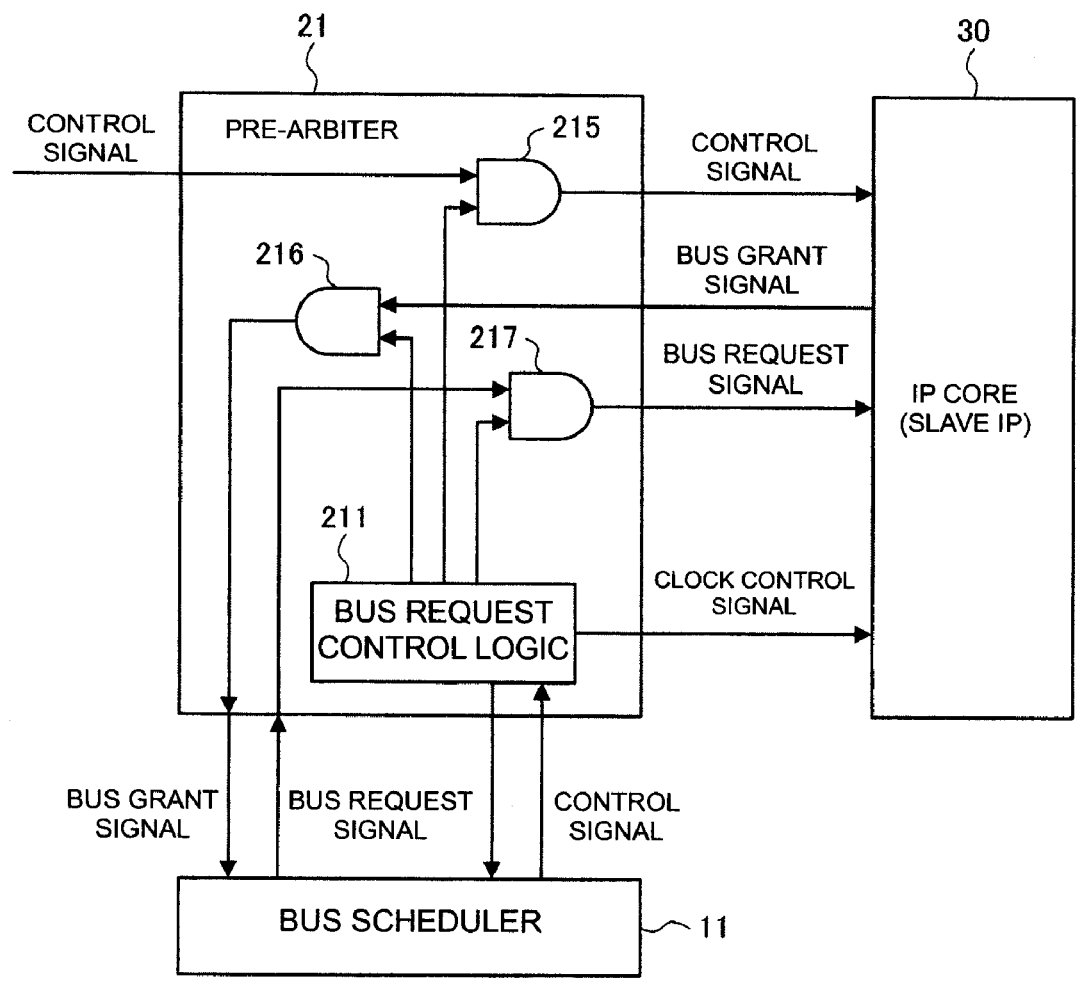
FIG. 3 illustrates a configuration of a pre-arbiter for slave IP core according to one embodiment of present invention.

FIG. 3 illustrates a configuration of one of the pre-arbiters 21 for slave IP cores (pre-arbiters 21D to 21F in the example in FIG. 1).

As illustrated in FIG. 3, the pre-arbiter 21 for slave IP core includes a bus request control logic 211 and AND circuits 215, 216, and 217. The bus request control logic 211 is similar to the bus request control logic 211 in the master IP pre-arbiter 21 illustrated in FIG. 2.

AND circuit 215 ANDs a control signal obtained from the bus 40 and a control signal output from the bus request control logic 211 and outputs the control signal to the IP core 30.

AND circuit 216 ANDs a bus grant signal output from the IP core 30 and a control signal output from the bus request control logic 211 and outputs the bus grant signal to the bus scheduler 11.

AND circuit 217 ANDs a bus request signal output from the bus scheduler 11 and a control signal output from the bus request control logic 211 and outputs the bus request signal to the IP core 30.

<Operation of Bus Control System>

Operation of the bus control system of the present embodiment will be described next.

Figure 4:
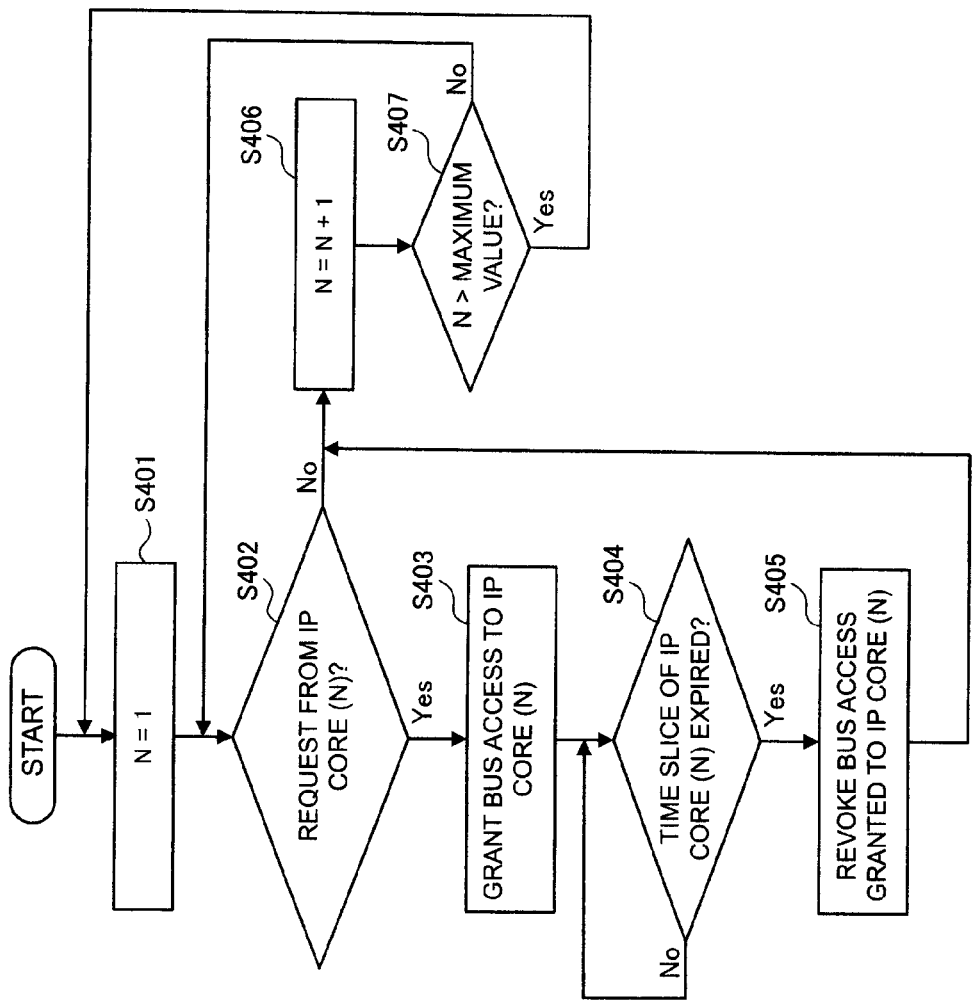
FIG. 4 is a flowchart illustrating operation for allocating bus access by a bus scheduler according to one embodiment of present invention.

FIG. 4 is a flowchart illustrating bus access allocation operation performed by the bus scheduler 11 according to one embodiment of the present invention.

The bus scheduler 11 first initializes the value of a variable N (N=1, 2, 3 in the example in FIG. 1) which is the number identifying a master IP core 30 to 1 (N=1) (step 401). The bus scheduler 11 then determines whether the IP core 30 (N) is requesting access to the bus 40 (step 402). Specifically, the bus scheduler 11 sends a control signal to the pre-arbiter 21 associated with the IP core 30 (N) in a time slice allocated to the IP core 30 (N). The bus scheduler 11 then determines on the basis of a control signal output from the bus request control logic 211 of the pre-arbiter 21 whether a bus request signal is output from the AND circuit 213. When the bus scheduler 11 receives the bus request signal, the bus scheduler 11 determines that the IP core 30 (N) is requesting access to the bus 40.

If the IP core 30 (N) is not requesting access to the bus 40, the bus scheduler 11 increments the variable N by 1 (step 406). If the value of the variable N does not exceed the number of the IP cores 30 (the maximum value) (No at step 407), the bus scheduler 11 makes determination at step 402 using the value of the variable N incremented at step 406. On the other hand, if the value of the variable N exceeds the number of the IP cores 30 (the maximum value) (Yes at step 407), the bus scheduler 11 returns to step 401, where the bus scheduler 11 initializes the value of the variable N, and then makes determination at step 402. That is, the bus scheduler 11 performs a loop process in which the bus scheduler 11 selects the IP cores 30 one after another in circular order to determine whether each of the IP cores 30 is requesting access to the bus 40.

If the IP core 30 (N) is requesting access to the bus 40 at step 402, the bus scheduler 11 grants access to the bus 40 (bus access) to the IP core 30 (N) (step 403). Specifically, the bus scheduler 11 sends a bus grant signal and a control signal for the bus request control logic 211 to the pre-arbiter 21 associated with the IP core 30 (N). In response to the control signal, the bus request control logic 211 sends a clock control signal to the IP core 30 (N) and the AND circuit 214 outputs the bus grant signal to the IP core 30 (N).

The bus scheduler 11 also controls the bus request control logic 211 of the pre-arbiter 21 associated with the IP core 30 (N) to allow the IP core 30 (N) to output a control signal and switches connection of the multiplexers 12 to 14 so as to allow the IP core 30 (N) to transfer data through the bus 40.

In order for the bus scheduler 11 to grant access to the bus 40 to an IP core 30 (N), the bus scheduler 11 needs to recognize that the slave IP core 30 to which the IP core 30 (N) wants to access can accept the access. The bus scheduler 11 controls the pre-arbiter 21 associated with the slave IP core 30 to cause the slave IP core 30 to output a bus grant signal. If a bus grant signal is obtained from the slave IP core 30, it means that the slave IP core 30 is ready to accept the access and therefore the bus scheduler 11 performs the operation described above for the pre-arbiter 21 of the slave IP core 30 (N) and the multiplexers 12 to 14 to grant bus access. The process that starts with receiving a request from the IP core 30 (N) and checking the status of the IP core 30 to be accessed and ends with granting bus access to the IP core 30 (N) is what is called an arbitration cycle. The arbitration cycle in the present embodiment is executed separately from access by the IP core 30 (N) through the bus 40 and therefore is not interrupted on expiration of the time slice.

Then the bus scheduler 11 determines whether the time slice assigned to the IP core 30 (N) as a data transfer cycle has expired (step 404). When the time slice assigned to the IP core (N) has expired, the bus scheduler 11 revokes the bus 40 access grant given to the IP core 30 (N) (step 405). Specifically, the bus scheduler 11 sends a control signal for the bus request control logic 211 to the pre-arbiter 21 associated with the IP core 30 (N). Then, the bus scheduler 11 sends a clock control signal, for example, to the IP core 30 (N) to stop the operation clock of the IP core 30 (N) to stop data transfer from the IP core 30 (N).

Then, the bus scheduler 11 increments the variable N by (step 406). If the value of the variable N does not exceed the number of the IP cores 30 (the maximum value) (No at step 407), the bus scheduler 11 makes determination at step 402 using the value of the variable N incremented at step 406. On the other hand, if the value of the variable N exceeds the number of the IP cores 30 (the maximum value) (Yes at step 407), the bus scheduler 11 returns to step 401, where the bus scheduler 11 initializes the value of the variable N, and then makes determination at step 402.

Returning to FIG. 1, the bus access allocation operation by the bus scheduler 11 will be described below more specifically.

It is assumed here that IP core 30 (1) depicted in FIG. 1 has requested access to the bus 40 (request). It is also assumed that the action to be performed by the IP core 30 (1) using the bus 40 is data write to IP core 30 (4).

The pre-arbiter 21 (A) associated with the IP core 30 (1) holds the request from IP core 30 (1) until bus access is granted by the bus scheduler 11. The pre-arbiter 21 (A) sends a bus request signal to the bus scheduler 11 to notify the bus scheduler 11 of the request. As a result, the determination at step 402 of the flowchart in FIG. 4 becomes Yes.

When the turn in which IP core 30 (1) is to be assigned a time slice comes around, the bus scheduler 11 grants bus access to the pre-arbiter 21 (A). The bus scheduler 11 then switches the multiplexers 12, 13 to allow a control signal from the IP core 30 (1) to be propagated to the bus 40. IP core 30 (4) to be accessed is identified by an address signal included in the control signal propagated to the bus 40. Accordingly, IP core 30 (4) responds and the data write is started. While connection of multiplexers 12, 13 was switched since the access was data write access, connection switching of multiplexer 14 would be performed as well in the case of data read.

The bus scheduler 11 monitors for expiration of the time slice it has assigned to the IP core 30 (1) as bus access. If the access by IP core 30 (1) to IP core 30 (4) is not completed in the bus access time slice, the bus scheduler 11 suspends the access by the IP core 30 (1). This is done by the bus scheduler 11 controlling pre-arbiter 21 (A) to stop the operation clock of IP core 30 (1) for example as described with respect to step 405 of FIG. 4.

After suspending the access by the IP core 30 (1), the bus scheduler 11 changes the bus access right to the next IP core (2). Here, if IP core 30 (2) has requested access to the bus 40, IP core 30 (2) is granted bus access and the IP core 30 (2) accesses the bus 40. If IP core 30 (2) has not requested access to the bus 40, bus access right is changed to the next IP core 30 in order. If no IP cores 30 except IP core 30 (1) have requested access to the bus 40, bus access is allocated again to IP core 30 (1), which then restarts (continues) the access by the IP core 30 (1).

<Bus Access Allocation Method>

A method for allocating bus access to each IP core 30 according to the present embodiment will be described next.

Figure 5:
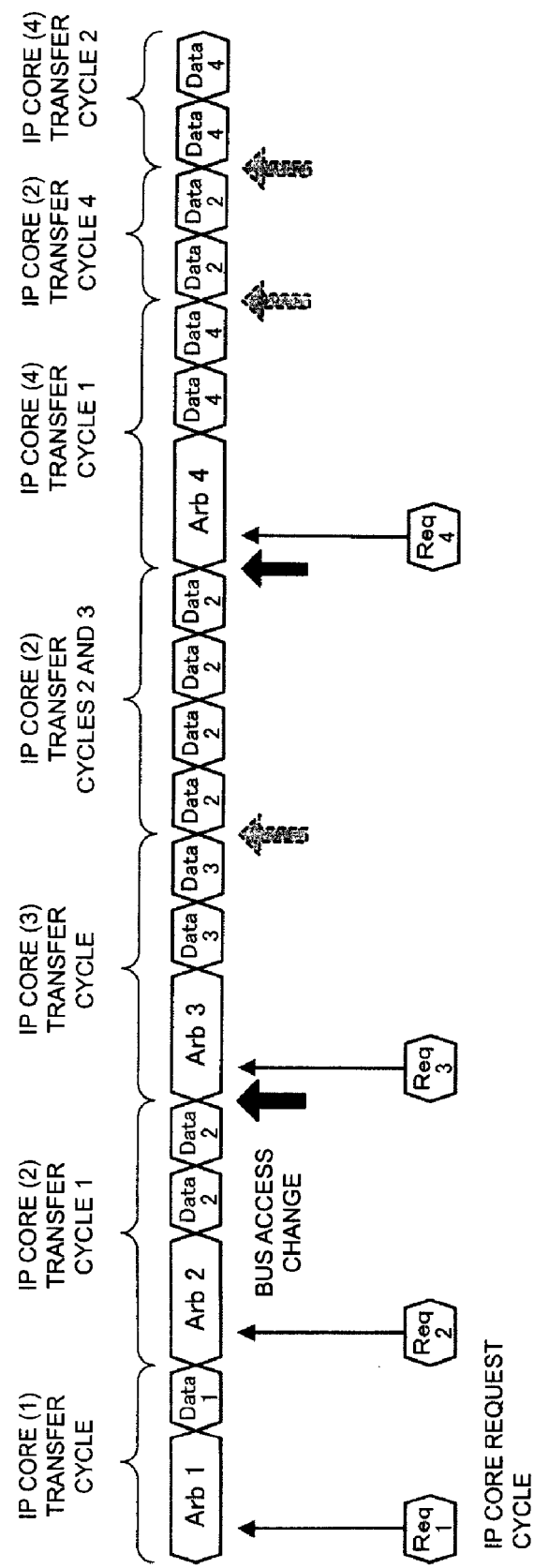
FIG. 5 illustrates an example of bus occupancy according to one embodiment of present invention.
Figure 6:
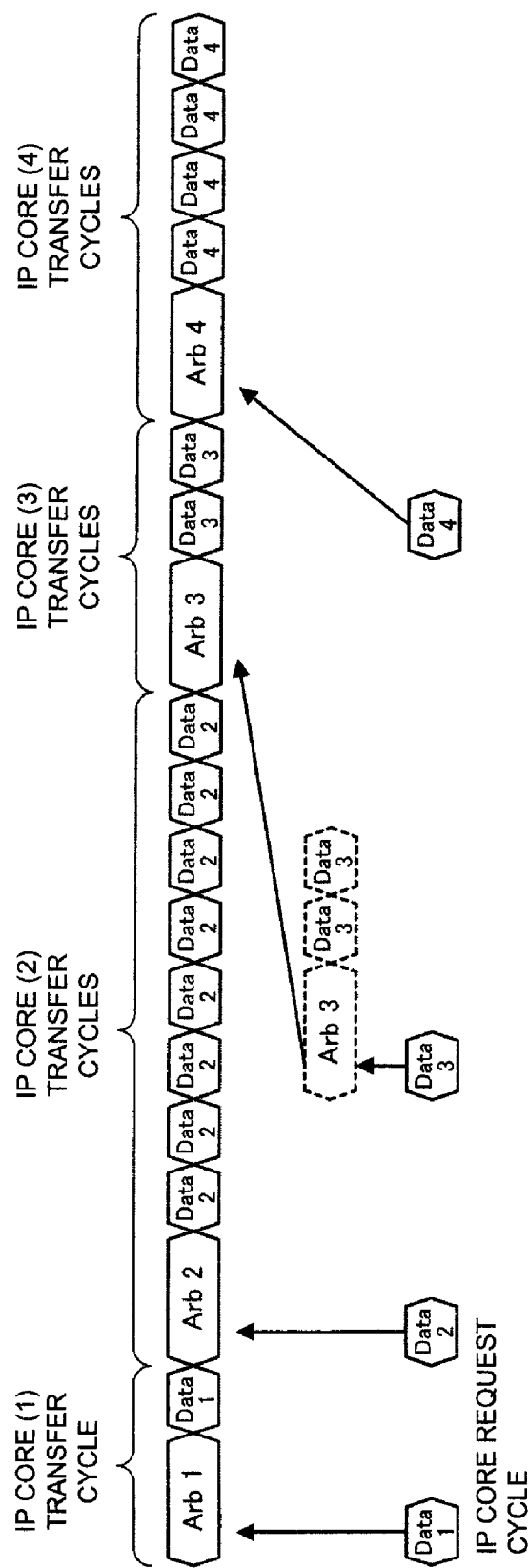
FIG. 6 illustrates an example of bus occupancy in a conventional bus control system.
Figure 7:
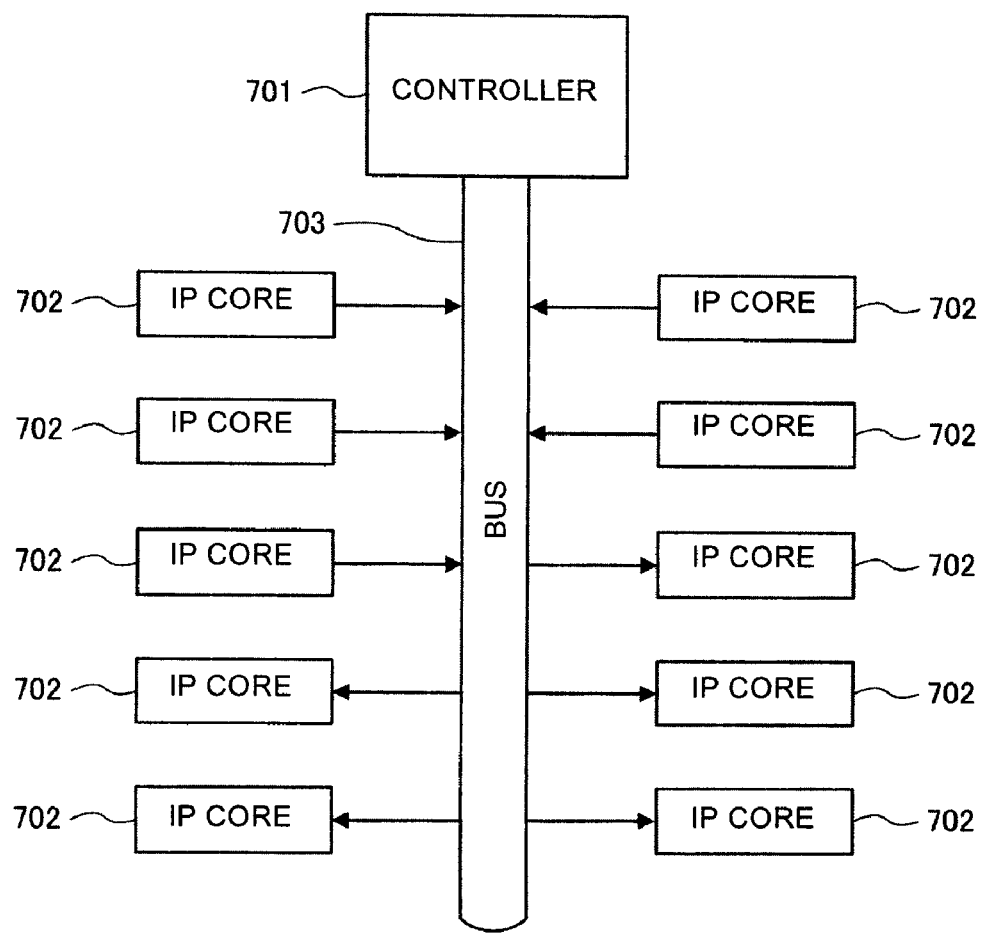
FIG. 7 schematically illustrates a configuration of the conventional bus control system.

FIG. 5 illustrates an example of bus 40 occupancy according to one embodiment of present invention. For comparison with the embodiment of present invention, FIG. 6 illustrates an example of bus 40 occupancy in a conventional bus control system when requests for access to the bus 40 are issued from IP cores 30 in the same way as in FIG. 5.

It is assumed that two time slices are assigned to each IP core 30 as a data transfer cycle in the example in FIG. 5. That is, two time slices are treated as a time unit for data transfer and bus access in the time unit can be transferred from one IP core to another. In FIG. 5, the IP cores 30 are assigned numbers that indicate the order in which the IP cores 30 have requested access to the bus 40, like IP core (1), ..., (4), to distinguish among the IP cores 30. The numbers are assigned for convenience of explanation of the examples in FIGS. 5 and 6 and do not match the numbers in FIG. 1. For example, IP core (4) is depicted as a slave IP core in FIG. 1, IP core (4) in FIGS. 5 and 6 is a master IP core requesting bus access and differs from IP core 30 (4) in FIG. 1.

In FIG. 5, an arbitration cycle for preparation (such as checking of the status of the IP core 30 to which data is to be transferred) for data transfer in a transfer cycle of each IP core 30 is denoted by "Arb" and each data transfer cycle in which data is actually transferred in the transfer cycle is denoted by "Data", and numbers 1 to 4 corresponding to the IP cores (1) to (4) are assigned to the cycles. Each request cycle in which a bus request signal is transferred from an IP core 30 to the bus scheduler 11 is denoted by "Req" and numbers 1 to 4 are assigned to the cycles as in the other transfer cycles.

In the example illustrated in FIG. 5, IP core (1) is first granted access to the bus 40 in response to a request (bus 40 access request) from IP core (1). After bus arbitration cycle "Arb1", data transfer cycle "Data 1" starts. The data transfer is completed in one time slice (the section indicated with "IP core (1) transfer cycle" in FIG. 5).

Then, IP core (2) issues a request. Since the transfer cycle of IP core (1) has ended, access to the bus 40 is granted to IP core (2) in response to the request. After arbitration cycle "Arb 2", data transfer cycle "Data 2" starts. The data transfer requires eight time slices, that is, four time units.

Upon completion of the data transfer by IP core (2) in one unit of time slices (the section indicated with "IP core (2) transfer cycle 1" in FIG. 5), IP core (3) issues a request. Since a unit of time slices is assigned to each IP core 30, bus access right is transferred to IP core (3). The bus access change occurs at the position indicated by a thick arrow in FIG. 5.

The data transfer by IP core (3) is completed in two time slices, that is, in one time unit (the section indicated with "IP core (3) transfer cycle" in FIG. 5). Since at this point no other IP cores 30 are requesting, the bus scheduler 11 grants bus access to IP core (2) which has yet to transfer data. The bus access change occurs at the position indicated by a dashed arrow in FIG. 5. The bus access change occurs according to scheduling by the bus scheduler 11 rather than a request from the IP core (2). Accordingly, a data transfer cycle of IP core (2) immediately starts without an arbitration cycle.

After bus access is granted to IP core (2) and data transfer in one unit is performed, the bus scheduler 11 changes bus access. However, at this time point, no other IP cores 30 have issued a request and no IP core 30 has been suspended from data transfer. Therefore, bus access is granted again to IP core (2). As a result, bus access change does not occur in effect and data transfer by IP core (2) is continued (the section indicated with "IP core (2) transfer cycles 2 and 3" in FIG. 5).

After the data transfer by IP core (2) in two units has been completed, IP core (4) issues a request. Since one unit of time slices is assigned to each IP core 30, bus access right is changed to IP core (4). The bus access change has been caused by the request from IP core (4) and is indicated by a thick arrow in FIG. 5. The data transfer requires four time slices, that is, two units.

After bus access has been granted to IP core (4) and data transfer in one unit has been performed, the bus scheduler 11 initiates bus access change. Since at this point IP core (2) still has data transfer to perform, bus access right is changed to IP core (2) (the section indicated with "IP core (4) transfer cycle 1" and "IP core (2) transfer cycle 4" in FIG. 5). The bus access change has occurred according to scheduling by the bus scheduler 11 and is indicated by a dashed arrow in FIG. 5.

After bus access has been granted to IP core (2) and data transfer in one unit has been performed, the bus scheduler 11 initiates bus access change. Since at this time point IP core (4) still has data transfer to perform, bus access right is changed to IP core (4) (the section indicated with "IP core (4) transfer cycle 2" in FIG. 5). The bus access change has occurred according to scheduling by the bus scheduler 11 and is indicated by a dashed arrow in FIG. 5.

With the operation described above, data transfer by IP cores (2) and (4) ends. If data transfer by IP cores (2) and (4) requires more time slices, data transfer by IP core (2) and data transfer by IP core (4) are performed alternately in every unit of time slices unless another IP core 30 issues a request.

As has been described above, according to the present embodiment, time slices are assigned to each IP core 30 and bus access change occurs every time unit. Accordingly, whenever there is data whose transfer has been suspended by a pre-arbiter 21 at a schedule time point, bus access change occurs to allow the data to be transferred. Since the time-slicing ensures transfer cycles, hard real-time accessibility is ensured and a bandwidth of the bus 40 (available bus band) allocated to each IP core 30 is ensured.

In contrast, in the conventional bus control method illustrated in FIG. 6, once bus access is passed from one IP core 30 to another, it cannot be predicted when bus access will be granted to the former IP core 30 next time. Therefore, when a request is issued from an IP core 30 during a transfer cycle of another IP core 30, the later IP core 30 cannot permit the interruption. When IP core (3) in FIG. 6 requests the bus, IP core (3) cannot transfer data until all transfer cycles of IP core (2) are completed and then bus access is granted to IP core (3). Similarly, IP core (4) is granted bus access after completion of all transfer cycles of IP core (3). Therefore it is difficult to ensure hard real-time accessibility and bandwidth for data transfer by IP cores (3) and (4).

Having described the present embodiment, the technical scope of the present invention is not limited to the scope described with respect to the embodiment. For example, the pre-arbiters 21 constituting the sub controller 20 may be any circuits that control execution and suspension of access by the individual IP cores 30 under the control of the bus scheduler 11 and their specific circuit configurations are not limited to those depicted in FIGS. 2 and 3. It will be apparent from the claims that various other modifications and improvements to the embodiment described above are also included in the technical scope of the present invention.

What is claimed is:

1. An apparatus which controls access by a plurality of IP cores to a bus, comprising:
   a main controller changing connection between each of the IP cores and the bus in accordance with a predetermined schedule; and
   a sub controller provided in association with each of the IP cores and controlling access by the IP cores to the bus in accordance with the schedule,
   wherein the main controller allocates access to the bus to each of the IP cores in accordance with the schedule and provides a notification of the allocation to the sub controller associated with the IP core, and the sub controller performs data transmission and reception by the IP core in accordance with the notification provided by the main controller.

2. The apparatus according to claim 1, wherein the schedule is determined on the basis of preset time slices.

3. The apparatus according to claim 1, wherein the main controller comprises:
- a selector changing connection between each of the IP cores and the bus; and
- a sequencer controlling connection change by the selector under program control.

4. The apparatus according to claim 1, wherein:
the main controller provides, in accordance with the schedule, a notification to the sub controller associated with each of the IP cores that the bus is available; and
the sub controller performs data transmission and reception by the IP core in a time slice identified by the notification provided by the main controller and suspends data transmission and reception by the IP core in time slices other than the time slice identified.

5. The apparatus according to claim 1, wherein:
the sub controller receives a request for access to the bus from the IP core and provides a notification of the request to the main controller; and
the main controller, when receiving the notification provided by the sub controller, allocates access to the bus to the IP core associated with the sub controller.

6. An apparatus which controls access by a plurality of IP cores to a bus, comprising:
- a main controller changing connection between each of the IP cores and the bus in accordance with a schedule predetermined based on predetermined time slices, allocating access to the bus to each of the IP cores, and providing a notification of the allocation to the IP core; and
- a sub controller provided in association with each of the IP cores, the sub controller receiving a request for access to the bus from the IP core; providing a notification of the request to the main controller; receiving the notification of the allocation of access from the main controller; performing data transmission and reception by the IP core in a time slice identified based on the allocated access; and suspending data transmission and reception by the IP core in time slices other than the time slice identified.

7. A method for controlling access by a plurality of IP cores to a bus by using a bus control apparatus, the bus control apparatus comprising a selector changing connection between each of the IP cores and the bus; a sequencer controlling connection change by the selector under program control; and a sub control circuit provided in association with each of the IP cores and controlling access by the IP core to the bus; the method comprising:
by the sequencer,
- allocating access to the bus to each of the IP cores in accordance with a predetermined schedule, and
- controlling connection change made by the selector on the basis of allocation of access to the bus and providing a notification of the allocation of access to the bus to the sub control circuit associated with each of the IP cores; and by the sub control circuit,
performing data transmission and reception by the IP core in accordance with the notification provided by the sequencer.

8. The method according to claim 7, wherein:
in the step of providing by the sequencer a notification of allocation of access, the sequencer provides information indicating a time slice in which the bus is available to the sub control circuit associated with each of the IP cores on the basis of the schedule; and
in the step of performing by the sub control circuit data transmission and reception by the IP core, the sub control circuit performs data transmission and reception by the IP core in a time slice identified by the notification provided by the sequencer and suspends data transmission and reception by the IP core in time slices other than the time slice identified.

9. The method according to claim 7, further comprising, by the sub control circuit, receiving a request for access to the bus from the IP core and providing a notification of the request to the sequencer;
wherein, in the step of providing by the sequencer the notification of the allocation of access to the bus to the sub control circuit, the sequencer provides the notification of allocation of access to the bus to the sub control circuit that has provided a notification of a request for access to the bus.

* * * * *